United States Patent
Uhlemann et al.

(10) Patent No.: US 6,680,032 B1
(45) Date of Patent: *Jan. 20, 2004

(54) PROCESS AND APPARATUS FOR PREPARING GRANULATES

(75) Inventors: Hans Uhlemann, Solingen (DE); Burkhard Braun, Odenthal (DE); Heinz Hausmann, Leichlingen (DE); Gerhard Stopp, Leverkusen (DE); Horts Karkossa, Leichlingen (DE)

(73) Assignee: Bayer AG, Leverkusen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/002,528

(22) Filed: Jan. 11, 1993

Related U.S. Application Data (63) Continuation of application No. 07/484,708, filed on Feb. 26, 1990, now abandoned, which is a continuation of application No. 07/224,524, filed on Jul. 26, 1988, now Pat. No. 4,946,654, which is a continuation of application No. 06/718,129, filed on Apr. 1, 1985, now abandoned.

(30) Foreign Application Priority Data

Apr. 7, 1984 (DE) .......................................... 34 13 200
Mar. 2, 1985 (DE) .......................................... 35 07 376

(51) Int. Cl.$^7$ ............................ B01J 8/08; B01J 8/18; B01J 8/20
(52) U.S. Cl. ...................... 422/147; 422/139; 422/140; 422/145; 427/213
(58) Field of Search ................................ 422/140, 143, 422/145, 147, 139; 426/648; 427/213; 118/62, 303, DIG. 5; 71/13, 64.01, 64.02, 64.03, 64.05, 64.06, 64.07, 64.13

(56) References Cited

U.S. PATENT DOCUMENTS

| | | | | |
|---|---|---|---|---|
| RE19,750 E | * | 11/1935 | Billings et al. ............. | 71/64.05 |
| 2,041,088 A | * | 5/1936 | Pfirrmann .................. | 71/64.02 |
| 2,600,253 A | * | 6/1952 | Lutz .......................... | 71/64.02 |

(List continued on next page.)

FOREIGN PATENT DOCUMENTS

| | | |
|---|---|---|
| DE | 139526 | 1/1980 |
| DE | 140005 | 2/1980 |
| DE | 3248504 | 7/1983 |
| EP | 0037066 | 10/1981 |
| GB | 1142046 | 2/1969 |

OTHER PUBLICATIONS

Abstract, USSR, Teplomassoobmen, 5th, "Hydrodynamics and heat transfer during granulation . . . ", 1976.

(List continued on next page.)

Primary Examiner—Jerry D. Johnson
Assistant Examiner—Alexa Ann Doroshenk
(74) Attorney, Agent, or Firm—Norris McLaughlin & Marcus (57) ABSTRACT

A new process for continuously preparing granules having narrow grain size distribution, comprising
  a) spraying the product to be granulated in liquid form into a fluidized bed,
  b) separating the proportions of fine material escaping from the fluidized bed from the off-gas and returning said fine material to the fluidized bed as nuclei for granule formation,
  c) setting the fluidizing gas flow such that granules are formed which are of a predetermined size, and
  d) removing the completed granules solely by way of at least one countercurrent gravity classifier inserted into the outflow bottom of the fluidized-bed vessel.

A new apparatus for carrying out the process according to the invention and new granules.

1 Claim, 7 Drawing Sheets

U.S. PATENT DOCUMENTS

| | | | | |
|---|---|---|---|---|
| 3,880,968 A | | 4/1975 | Kasper et al. | |
| 3,941,578 A | * | 3/1976 | Tucker et al. | 71/64.07 |
| 4,042,366 A | * | 8/1977 | Fersch et al. | 71/64.07 |
| 4,077,847 A | * | 3/1978 | Choi et al. | 201/21 |
| 4,217,127 A | | 8/1980 | Kono et al. | |
| 4,337,722 A | * | 7/1982 | Debayeux et al. | 118/303 |
| 4,353,709 A | | 10/1982 | Nioh et al. | |
| 4,387,120 A | * | 6/1983 | Barnert | 427/213 |
| 4,420,319 A | * | 12/1983 | Holtz | 71/64.06 |
| 4,449,900 A | * | 5/1984 | Lerner | 71/64.06 |

OTHER PUBLICATIONS

Article "Granulation of Ammonium Sulfate Fertilizer in a Spouted Bed", Uemaki et al, Ind. Eng. Chem., Process Des. Dev., vol 15, No. 4, 1976, pp 504–508.

Abstract, Japan. Koho 83/44014," Granulating Apparatus", 9/83.

Abstract, Eur. Pat. Appl. 26,918,"Granulation process", 4/81.

Abstract, Eur. Pat. Appl. 30,192, "Device for introducing a gaseous current . . . ", 6/81.

Abstract, Jpn. Tokkyo Koho 80/45253, "Particle flow rate . . . ", 11/80.

Abstract, Eur. Pat. Appl. 31,264, "Apparatus for granulating and/or coating in a spouting bed", 7/81.

Abstract, Belg. BE 886,412, Device for the spraying of feed material . . . , 3/81.

Abstract, "Analysis of continuous spouted–bed granulation.", Ind.Eng.Chem. Process Des. Dev. 1978.

Abstract, "Analysis of spouted–bed coating and granulation.", Ind.Eng.Chem. Process Des. Dev. 1983.

Granulation in der Wirbelschicht Michael Rosch und Richard Probst pp. 1–6 9 Jahrgang, Nr. 2, Feb. 1975, Sonderdruck aus verfahrenstechnik.

Berechnung der Verteilungssperktren von Feststoffgranulatteilchen in Wirbelschtapparaten mit klassierendem Abzug pp. 242–245 Chem. Techn., 30. jg., Heft 5. Mai 1978.

Zum Kugelwachstum bei Wirbelschichttrocknung von Suspensionen oder Losungen pp. 540–542 Chem. Techn. 29, Jg., Heft 10. Oktober 1977.

* cited by examiner

PROCESS AND APPARATUS FOR PREPARING GRANULATES

This application is a continuation of application Ser. No. 07/484,708, filed Feb. 26, 1990, now abandoned, which is a continuation of application Ser. No. 07/224,524, filed Jul. 26, 1988, now U.S. Pat. No. 4,946,654, which is a continuation of application Ser. No. 06/718,129, filed Apr. 1, 1985, now abandoned.

The present invention relates to a new process and a new apparatus for preparing granulates. The invention also relates to granulates which are obtained by means of the new process.

There already are numerous known processes for preparing granular material by fluidised-bed granulation (compare Chem. Ing. Techn. 45, 736–739 (1973), DE-OS (German Published Specification) 2,231,445, DE-OS (German Published Specification) 2,555,917 and EP-OS (European Published Specification) 0,087,039). In these disclosed processes, which are carried out continuously, the ready-to-use granulate is obtained in one step without separate post-drying. In essence, it is possible to distinguish three different methods in this context which, however, are all based on the same granulate formation process. Thus, in each case the product to be granulated is of sprayable consistency, that is to say in the form of a melt, suspension or solution, when sprayed into a fluidised bed. The sprayed-in liquid product first wets the surface of the solid particles in the fluidised bed and then solidifies by drying on or cooling down. In this way the particles grow in shell-like fashion, and their size increases the longer they dwell in the fluidised bed. For that reason the granulate size depends critically upon the bed content.

The growth of the particles starts in the fluidised bed from nuclei which either are formed in the fluidised bed itself by non-impacting solidifying drops of spray or are produced by abrasion of solid particles already present, or which are fed into the fluidised bed from the outside. Nucleation which takes place in the fluidised bed (internal nucleation) is affected by the content of the fluidised bed in such a way that as the bed content grows there is on the one hand a decrease in the number of non-impacting droplets of spray and on the other an increase in the number of nuclei produced by abrasion.

The process which is required for producing granulates in a predetermined grain size is, in fluidised-bed granulation, the interaction of nucleus availability and granulate growth. Therefore, the process of granulation can be affected in many and varied ways. Thus, for example, the availability of nuclei can be increased by adding nuclei from the outside.

Steady-state granulation conditions have been reached when the bed content remains constant. In the steady state the mass of solid material fed into the fluidised bed must correspond to the mass of completed granulates removed from the bed. In addition to this mass balance, however, the particles need also to be in balance. That is to say, all the granulates removed from the fluidised bed must be replaced in number by new nuclei. In the known methods, a constant granulate formation process is forced on the system. The methods differ in the manner in which this constancy is obtained.

In the case of the processes disclosed in DE-OS (German Published Specification) 2,231,445 and EP-OS (European Published Specification) 0,087,039, only internally formed nuclei are used. The control of the associated low fluidised-bed content actuates a discharge element according to the principle of fill level control and hence ensures that the granulate removal matches product intake. The granulate emerging from the granulator is classified, and the resulting fines are returned into the granulator. Since, however, in the case of different throughputs through the serially connected apparatus elements of classifying line and discharge element the fill level control gets out of step, the only classifying line which can be used in this case is a classifying line where the amount of granular material which is let through matches the required throughput through the discharge element irrespective of separating efficiency. Accordingly, the classifying line employed in the methods described in DE-OS (German Published Specification) 2,231,445 and EP-OS (European Published Specification) 0,087,039 is in each case a second fluidised bed. This second fluidised bed provides only very inefficient classification of the granulates. For that reason, this process is unsuitable for producing granulates having a narrow grain size distribution.

The granulating process communicated in DE-OS (German Published Specification) 2,263,968 is in principle identical to the method described above. However, the classifying line employed in this instance is not a second fluidised bed but an efficiently separating sieve. The necessary synchronisation of the throughputs through the classifying line and the discharge element is achieved by not removing a portion of the granular material but instead grinding it and then returning it to the fluidised bed. This additional availability of nuclei needs to be compensated by reducing nucleation in the fluidised bed. The reduction of nucleation in the fluidised bed is achieved by operating the granulator at a high bed content. However, the prerequisite for this mode of operation is an abrasion-resistant granulate.—This method thus provides granulates of narrow grain size distribution. However, it is a disadvantage that a comparatively high amount of apparatus needs to be used. In addition, this method cannot be used for granulating solvent-moist or dust explosion hazard products, since the apparatus required in addition to the fluidised-bed granulator cannot be inertised nor be installed to withstand explosive pressure.

In the third alternative disclosed in DE-OS (German Published Specification) 2,555,917 for producing granulates by the fluidised-bed/spray method, the discharge element used is a countercurrent gravity classifier This classifier combines the functions of classifying line and discharge element.

Using this apparatus, only granulates which have reached the desired grain size are removed from the fluidised bed. Any variation in the number of discharged granulates has an immediate effect on the bed content. If, for example, the bed content rises, the granulates produced are too small. Consequently, the growth of granulates needs to be promoted and the feed of nuclei, which is in this case from the outside, needs to be cut back. To be able to apply effective control measures to the number of nuclei available for the granulation process it is necessary for internal nucleation to be minimised, which, in the case of abrasion-resistant granulates, can be obtained by granulation with high bed content.—In the final analysis this known method produces granulates within a narrow grain size distribution. However, it is a disadvantage that the method requires controlled outside supply of nuclei which is complicated. Furthermore, conversion of the process from a certain mean grain size to another mean grain size is associated with extensive preliminary experimental work to determine the exact settings. That is also true of the other processes described above.

A new process has now been found for the continuous preparation of granulates having narrow grain size distribution, characterised in that a) the product to be granulated is sprayed in liquid form into a fluidised bed,
b) the proportions of fine material escaping from the fluidised bed in the off-gas are separated off and returned into the fluidised bed as nuclei for granulate formation,
c) the granulation process in the fluidised bed is influenced solely by setting the classifying gas stream in such a way that granulates are formed which are of the size predetermined by the classifying gas stream, and
d) the completed granulate is removed solely by way of one or several countercurrent gravity classifiers which are inserted into the outflow bottom of the fluidised-bed apparatus, and
e) if desired the granulates thus obtained are subjected to a thermal aftertreatment.

A new apparatus for the continuous preparation of granulates having a narrow grain size distribution has also been found. The apparatus essentially comprises a fluidised-bed reactor which contains devices for dispersing the product supplied in sprayable form, which further contains a system suitable for returning proportions of fine material escaping from the fluidised bed and to the outflow bottom of which there are directly attached one or several countercurrent gravity classifiers.

Finally, new granulates found and prepared by the process according to the invention contain 1 to 100 per cent by weight of at least one active component, 0 to 99 per cent by weight of inert filler material and 0 to 40 per cent by weight of dispersing and/or binding agent and optionally additives, have a mean grain size of 0.1 to 3 mm, have a narrow grain size-distribution wherein the largest and the smallest particle diameters differ from the mean by at most half an average grain size, are uniformly shaped and homogeneously constituted and have a compact microporous structure and are spontaneously dispersible or soluble in water or other solvents.

The process according to the invention differs from all the corresponding predisclosed processes in that the granulate formation process, through the interaction between granulate growth and nucleation, automatically adjusts to the size of the discharged granulates which is predetermined by the classifying gas supply.

The process according to the invention is distinguished from the analogous predisclosed methods by a number of advantages. For instance, granulates of whichever particle size is desired can be prepared and the particle diameter (grain spectrum) is within very narrow limits. Furthermore, the size of the particles can be varied from case to case in a simple manner by means of the classifying gas supply; no changes to the apparatus are necessary. On the contrary, the particle size can even be changed without interruption of production.

It is of particular advantage that only granular material, i.e. granulates, of the desired size is produced. No material is lost, since undersize grain—that is to say particles which are too small—remain in the fluidised bed until they have reached the desired size. Oversize grain—that is to say excessively large particles—is likewise not formed since the particles are removed from the fluidised bed by constant classifying. Grinding processes and sieving processes are therefore dispensed with completely. Nor is it necessary to add outside nuclei to affect the process. It is also favourable that the liquid products to be sprayed into the fluidised bed in the course of the process according to the invention can have a very high solids content. The resulting granulates are uniformly shaed and homogeneously constituted and, despite high strength, are spontaneously dispersible or dissolvable in water or other solvents. Since the process makes low demands on the abrasion resistance of the granulates, it is also possible to prepare granulates of low binder content, thereby favouring their dispersing properties. Finally, the process according to the invention can also be used for processing solvent-moist and dust explosion hazard products since the required apparatus can be inertised and be constructed to withstand explosive pressures.

In the process according to the invention, the product to be granulated is sprayed in liquid form into a fluidised bed. This liquid form can be a melt, solution or suspension (slurry).

The liquid to be sprayed in can contain one or more active components. Suitable active components are not only substances which are solid at room temperature but also those which are liquid at room temperature. The only precondition for the use of liquid active components is that they are applied to solid carrier substances before granulation. The active components can be soluble or insoluble in water. They need to be stable to hydrolysis to the extent that, in the course of the process according to the invention and in the course of application of the resulting granulates, they do not undergo noticeable decomposition in the presence of water.

Possible active components are agrochemical active substances, active substances for combating pests in the domestic and hygiene areas, pharmacologically active substances, nutriments, sweeteners, dyestuffs and organic or inorganic chemicals.

Agrochemical substances are to be understood as meaning in the present case active substances which are customarily usable in crop protection. They preferably include insectcides, acaricides, nematicides, fungicides, herbicides, growth regulators and fertilisers. Specific examples of such active substances are: O,O-diethyl O-(4-nitrophenyl) thionophosphate, O,O-dimethyl O-(4-nitrophenyl) thionophosphate, O-ethyl O-(4-methylthiophenyl) S-propyldithiophosphate, (O,O-diethylthionophosphoryl)-α-oxominophenylacetonitrile, 2-isopropoxyphenyl N-methylcarbamate, 3,4-dichloropropionanilide, 3-(3,4-dichlorophenyl)-1,1-dimethylurea, 3-(4-chlorophenyl) 1,1-dimethylurea, N-(2-benzothiazolyl)-N,N'-dimethylurea, 3-(3-chloro-4-methylphenyl)-1,1-dimethylurea, 3-(4-isopropylphenyl)-1,1-dimethylurea, 4-amino-6-(1,1-dimethylethyl)-3-methylthio-1,2,4-triazin-5(4H)-one, 4-amino-6-(6,1-dimethylethyl)-3-ethylthio-1,2,4-triazin-5(4H)-one, 1-amino-6-ethylthio-3-(2,2-dimethylpropyl)-1,3,5-triazine-2,4-(1H,3H)-dione, 4-amino-3-methyl-6-phenyl-1,2,4-triazin-5(4H)-one; 2-chloro-4-ethylamino-6-isopropylamino-1,3,5-triazine, the R-enantiomer of the trimethylsilylmethyl ester of 2-[4-(3,5-dichloropyridyl-2-oxy)-phenoxy]-propionic acid, the R-enantiomer of the 2-benzyloxyethyl ester of 2-[4-(3,5-dichloropyridyl-2-oxy)-phenoxy]-propionic acid, 2,4-dichlorophenoxyacetic acid, 2-(2,4-dichlorophenoxy)-propionic acid, 4-chloro-2-methylphenoxyacetic acid, 2-(2-methyl-3-chlorophenoxy)-propionic acid, 3,5-diiodo-4-hydroxybenzonitrile, 3,5-dibromo-4-hydroxybenzonitrile and diphenyl ethers and phenylpyridazines, such as, for example, pyridates, furthermore 2,3-dihydro-2,2-dimethyl-7-benzofuranyl methylcarbamate, 3,5-dimethyl-4-methylthiophenyl N-methylcarbamate, O,O-diethyl O-(3-chloro-4-methyl-7-coumarinyl) thiophosphate, N,N-dimethyl-N'-

(fluorodichloromethylmercapto)-N'-(4-methylphenyl) sulfamide, 1-(4-chlorophenoxy)-3,3-dimethyl-1-(1,2,4-triazol-1-yl)-butan-2-one, 1-(4-chlorophenoxy)-3,3-dimethyl-1-(1,2,4-triazol-1-yl)-butan-2-ol, 1-cyclohexyl-4,4-dimethyl-3-hydroxy-2-(1,2,4-triazol-1-yl)-pent-1-ene, 2-(2-furyl)-benzimidazole, 5-amino-1-bis-(dimethylamido)-phosphoryl-3-phenyl-1,2,4-triazole, 4-hydroxy-3-(1,2,3,4-tetrahydro-1-naphthyl)-coumarin, O,O-dimethyl S-[1,2-bis-(ethoxycarbonyl)-ethyl]-dithiophosphate, O,O-dimethyl O-(4-methylmercapto-3-methylphenyl)-thionophosphate, O-ethyl O-(2-isopropyloxycarbonylphenyl) N-isopropylamidothionophosphate and (S)-α-cyano-3-phenoxybenzyl (1R)-cis-3-(2,2-dibromovinyl)-2,2-dimethylcyclopropanecarboxylate.

Active substances for combating pests in the domestic and hygiene are as are to be understood as meaning in the present case substances which can customarily be used for such purposes. Examples which may be mentioned are: 2-isopropoxyphenyl-N methylcarbamate, O,O-diethyl O-(4-nitrophenyl) thionophosphate, O,O-dimethyl O-(4-nitrophenyl) thionophosphate, O,O-dimethyl S-[1,2-bis-(ethoxycarbonyl)-ethyl]-dithiophosphate, O,O-dimethyl O-(3-methyl-4-nitrophenyl) thionophosphate, O,O-dimethyl O-(4-methylmercapto-3-methylphenyl) thionophosphate, cyclohex-1-ene-1,2-dicarboximidomethyl 2,2-dimethyl-3-(2-methylpropenyl)-cyclopropanecarboxylate.

Pharmacologically active substances is to be understood as meaning in the present case not only substances which can be used in veterinary medicine but also substances which can be used in human medicine. An example which may be mentioned of a substance which can be used in veterinary medicine is α-cyano-3-phenoxy-4-fluorobenzyl 2,2-dimethyl-3-[β-(p-chlorophenyl)-β-chlorovinyl]-cyclopropanecarboxylate. An example which may be mentioned of a substance which can be used in human medicine is acetylsalicylic acid.

Nutriments is to be understood as meaning not only substances for human consumption but also substances for animal consumption. Examples which may be mentioned are: citric acid, vitamins, coffee powder, tea powder and cocoa powder.

Examples which may be mentioned of sweeteners are sodium cyclamate and saccharin.

Dyestuffs is to be understood as meaning in the present case substances suitable for preparing dyestuff dispersions or dyestuff solutions which are used as colorants and/or paints. For instance, water-soluble dyestuffs, such as anionic, cationic and reactive dyestuffs, or water-insoluble dyestuffs, such as vat dyestuffs, polyester dyestuffs and pigment dyestuffs, can be used. Examples which may be mentioned are: indanthrene dyestuffs, cerofix dyestuffs, astrazone dyestuffs, triarylamine dyestuffs, triarylmethane dyestuffs, methine dyestuffs, anthraquinone dyestuffs, indigo dyestuffs, sulphur dyestuffs, azo dyestuffs and pigment dyestuffs.

Suitable organic and inorganic chemicals are those substances which are preferably used in the form of aqueous dispersions for synthetic purposes. It is also possible to use aqueous zeolite suspensions. Zeolites is to be understood as meaning substances of this type as described in Ullmann, 4th edition, volume 17, pages 9 et seq. under the entry "Molekularsiebe" [Molecular sieves].—It is also possible to use suspensions of inorganic oxides which are suitable for preparing catalysts or catalyst supports. Examples which may be mentioned thereof are aluminium oxide and silicon dioxide.

The liquid product to be sprayed into the fluidised bed in the course of the process according to the invention, in addition to the active components and to any liquid diluent present, can also contain inert fillers, dispersants, binders and/or additives, such as, for example, preservatives and dyestuffs.

The fillers can be any filler and carrier substance customarily used in water-dispersible or water-soluble granulates or in oil- and oil-soluble granulates. Substances of that type which are preferably used are inorganic salts, such as alkali metal, magnesium and ammonium chlorides and sulphates, for example magnesium sulphate, potassium sulphate, sodium sulphate, potassium chloride, ammonium sulphate, lithium sulphate and ammonium chloride, furthermore oxides, such as magnesium oxide, nitrates, carbonates, hydrogen carbonates, silicates, talc, chalk, quartz powder, kaolin, montmorillonite, bentonite, attapulgite and sepiolite, and also graphite, furthermore urea and urea derivatives, such as hexamethylenetetramine and casein, and also carbohydrates, such as starch, sugar, alginates and derivatives thereof, cereal flours, such as wheat flour and rice flour, and also kelzanes, methylcellulose and hydroxypropylmethylcellulose, and finally water-soluble polymers, such as polyvinyl alcohol and polyvinylpyrrolidone.

The dispersants used are preferably: condensation products of aromatic sulphonic acids and formaldehyde, such as condensation products of sulphonated ditolyl ether and formaldehyde, and also ligninsulphonic acid salts, such as lithium, sodium, potassium, magnesium, calcium and ammonium salts of ligninsulphonic acid, and also methylcellulose, polyoxyethylene/fatty acid ester, polyoxyethylene/fatty alcohol ether, for example alkylarylpolyglycol ether, alkyl sulphonates and protein hydrolysates.

Even dispersants themselves can be processed from their solutions into readily redissolvable granulates.

It is also possible to process slurries of anionic detergents, if desired in the presence of additives of nonionic surfactants, builders, optical brighteners, of softeners and/or of scents.

The binders can be any binder (adhesive) customarily present in water-dispersible and water-soluble granulates or in oil-dispersible and oil-soluble granulates. Preference is given to the use of solutions, emulsions or latexes of natural or synthetic substances, such as methylcellulose, dextrose, sugar, starch, alginates, glycols, polyvinylpyrrolidone, ligninsulphonate, gum arabic and polyvinyl alcohol and polyvinyl acetate in water or low-boiling organic solvents, such as methanol, ethanol, butanol and methylene chloride.—In some cases it is even possible to use waterglass and silica sol.

Examples of preservatives which can be present in the liquid products to be sprayed in the course of the process according to the invention are 2-hydroxy-biphenyl, sorbic acid, p-hydroxybenzaldehyde, methyl p-hydroxybenzoate, benzaldehyde, benzoic acid and propyl p-hydroxybenzoate. Examples which may be mentioned of dyestuffs which can also be used as additives are inorganic pigments, such as iron oxide, titania and blue ferrocyanide, and organic dyestuffs, such as alizarin, azo and metal-phthalocyanine dyestuffs.

If, in the course of the process according to the invention, use is made of active components and binders which are present in the form of solids at room temperature, it is necessary to introduce these active components or binders into the fluidised bed in the form of a melt, of a solution or a suspension. To prepare solutions or suspensions of such active components or binders any customary inert organic solvent and water can be used. Organic solvents which can be preferably used for this purpose are alcohols, such as ethanol and glycol, and also aliphatic and aromatic, optionally halogenated hydrocarbons, such as ligroin, hexane, petrol, benzene, toluene, xylene, methylene chloride, carbon tetrachloride and chlorobenzene, and also ethers, such as dioxane, tetrahydrofuran and anisole, and also ketones, such as acetone, methyl ethyl ketone and cyclohexanone, and furthermore highly polar solvents, such as hexamethylphosphoramide, acetonitrile, dimethylformamide and dimethyl sulphoxide. Particular preference is given to the use of water.

The solids content of the liquid products sprayed into the fluidised bed in the course of the process according to the invention can be varied within a relatively wide range. In general the solids content on the use of suspensions (slurries) is between 5 and 75% by weight, preferably between 10 and 65% by weight.

The liquid products to be sprayed are prepared in conventional manner by mixing the constituents in the desired mixing ratios and, if appropriate, subsequently heating the resulting mixtures.

The granulation can be carried out in air or in inert gases, such as, for example, nitrogen. In the process according to the invention, the granulation can be started up in a fluidised-bed apparatus which already contains starting granulate. However, it is also possible to start the granulation in an empty apparatus. In this case the fluidised-bed granulation according to the invention starts off as a spray-drying. Through gradual build-up of the fluidised bed it then leads to a packed bed wherein the granulates reach the desired size and are discharged. If the products used tend to form deposits on the walls of the apparatus, it is advantageous to start up the process by presenting starting granulate. The effect of this measure is substantially to avoid possible spraying against the walls.

The liquid product to be granulated is introduced into the fluidised bed in the course of the process according to the invention by means of spray nozzles. It is particularly advantageous to use two-material nozzles.

The atomisation gas used can be any gas which is inert under the operating conditions. Preference is given to the use of air or inert gases, such as, for example, nitrogen. The amount of atomisation gas can be varied within a relatively wide range, and it generally depends on the dimensions of the apparatus and on the nature and the amount of the product to be sprayed in. In general, the amounts of atomisation gas used are, relative to the product used, 0.1 kg of gas/kg of feed to 10 kg of gas/kg of feed, preferably 0.5 kg of gas/kg of feed to 5 kg of gas/kg of feed. The temperature of the atomisation gas stream can likewise be varied within a relatively wide range. The atomisation gas temperatures used are generally between 0° C. and 250° C., preferably between 20° C. and 200° C.

The proportions of fine material which escape from the fluidised bed in the off-gas are separated off and are returned into the fluidised bed as nuclei for the granulate formation process. The way the fine material is returned can be internal or external. In the internal return of fine material, the dust is separated off at a filter placed directly on the fluidised bed and is transported back into the fluidised bed by means of cleaning-off pulses. In the external return of fine material, the dust is separated from the off-gas outside the granulator. To separate the escaping proportions of fine material, any apparatus customarily used for such purposes can be used. In a particularly preferred embodiment, the fine material is separated off by means of a cyclone or a dust filter. The separated-off fine material is transported back into the spray zone of the fluidised bed. This return transport is preferably effected pneumatically. The drive gas used can be any customary gas which is inert under the operating conditions. Preference is given to the use of air and inert gases, such as, for example, nitrogen. The amount of drive gas can be varied within a relatively wide range; it depends in general on the dimensions of the apparatus and on the escaping amount of fine material. The amounts of drive gas used are in general 0.01 kg of gas per kg of fine material to 2 kg of gas per kg of fine material, preferably 0.1 to 1 kg of gas per kg of fine material. The temperature of the drive gas stream can likewise be varied within a relatively wide range. The temperatures used are generally between 20° C. and 350° C., preferably between 30° C. and 300° C.

The granulation process in the fluidised bed in the process according to the invention is maintained solely by the sprayed-in rate of the liquid product to be granulated and the intensity of the classifying gas stream. No additional nuclei are supplied from the outside. The classifying gas used can be any customary gas which is inert under the operating conditions. Preference is given to the use of air and inert gases, such as, for example, nitrogen. The amount of classifying gas can be varied within a relatively wide range; it depends on the dimensions of the apparatus and the grain size and the mass flow of the granulates to be discharged. The classifying gas amounts used are in general between 0.2 kg of gas per kg of granulate and 5 kg of gas per kg of granulate, preferably between 0.4 and 2 kg of gas per kg of granulate. The temperature of the classifying gas stream can likewise be varied within a relatively wide range. The classifying gas temperatures used are in general between 20° C. and 350° C., preferably between 30° C. and 300° C.

The classifying gas speed depends on the grain size and the density of the granulate to be discharged. The classifying gas speeds used are in general between 0.5 and 15 m/sec, preferably between 1 and 5 m/sec.

The completed granulate is discharged in the course of the process according to the invention by way of one or several countercurrent.gravity classifiers. This type of discharging element can be any customary classifier which works by the principle of countercurrent gravity classification. If a particularly narrow grain distribution is desired, a zig-zag classifier is used as a specific embodiment.—In order to keep the amount of classifying gas as low as possible, for reasons of energy, in carrying out the process according to the invention preference is given to the use of a classifier having a zig-zag cross-section (=zig-zag classifier) where the gap length and hence the classifier cross-section can be set by means of bars which are connected to one another in the manner of a comb, which are adapted to the zig-zag cross-section and which are slideable at right angles to the axis of the classifier. In a preferred embodiment, the classifier contains an adjusting means for the bars which is connected to a regulating device which regulates the classifying gas stream in such a way that the flow velocity in the classifier remains constant despite the variable cross-section.

The process according to the invention is generally carried out under atmospheric pressure. However, it is also possible to work under superatmospheric pressure or reduced pressure. The output point of the countercurrent gravity classifier is generally kept under atmospheric pressure. Said atmospheric pressure is obtained by connecting to the classifier, in between the off-air fan and the output point, a pressure regulator which adjusts the off-air fan or a butterfly valve or an analogous device and which constantly adapts the pressure at the output point of the classifier to the ambient pressure. If no atmospheric pressure prevails at the output point of the classifier, it is necessary to install locks for maintaining the desired pressure.

BRIEF DESCRIPTION OF DRAWINGS

The course of the process according to the invention and the apparatus required therefor are illustrated in the accompanying drawings, in which.

Figure 1:
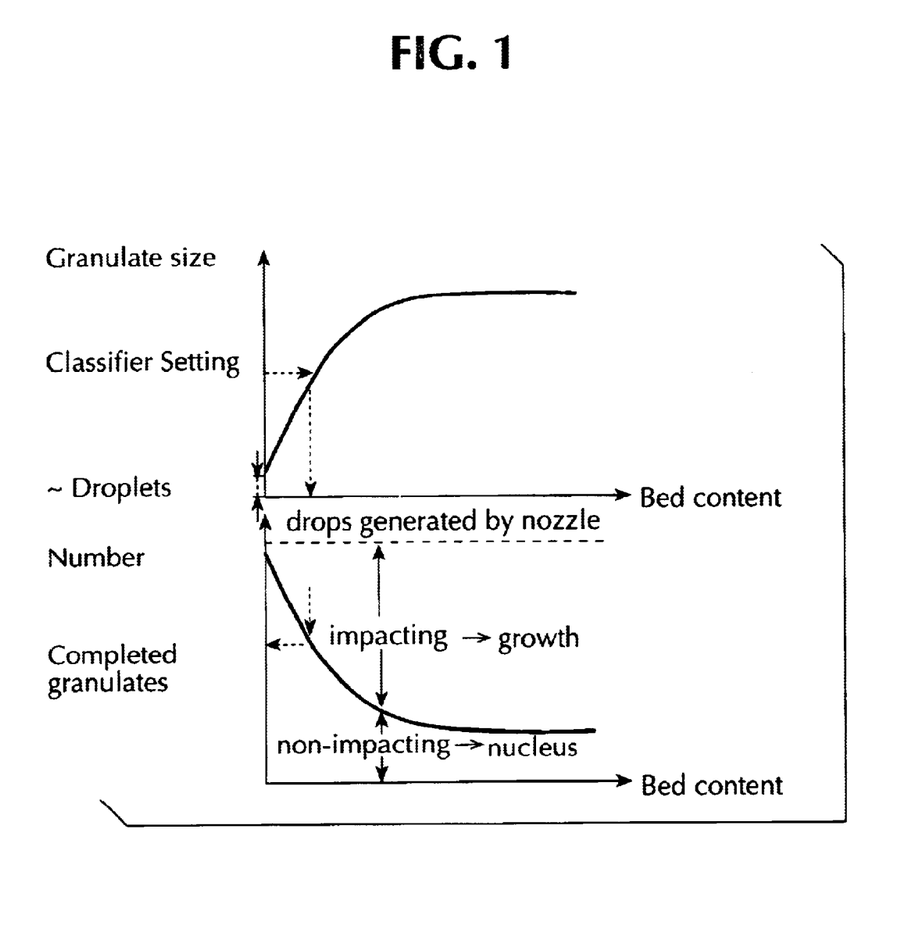
FIG. 1 shows a diagram for elucidating the interaction between granulate growth and nucleation without consideration of abrasion.

The dependence depicted in FIG. 1 between the size and the number of the granulate particles upon the content of the fluidised bed corresponds to the conditions which are likely in the production of a completely abrasion-resistant product.

Some of the droplets generated by the nozzle impact on the particles circulating in the fluidised bed and hence cause these particles to grow. The non-impacting droplets solidify. They become rigid in the case of a melt; they dry in the case of a suspension; and they crystallise in small particles in the case of a solution being sprayed. They are separated out of the off-gas and are returned into the spray zone of the fluidised bed. They consequently become new nuclei on which further particles can accumulate. With increasing bed content (the start corresponds to spray-drying) the growth of the particles is favoured at the expense of nucleation. The size of the discharged granulates in the steady state depends directly on the number of nuclei formed, since the number of completed granulates which need to be discharged is the same as the number of nuclei formed. The dry weight which is fed in needs to become distributed over the number of completed granulates. Consequently, the size of the granulates is predetermined, for simplicity the size of the granulates being understood here as meaning the weight of a granulate grain.

A large number of nuclei and a correspondingly low bed contend can therefore be used to produce many small granulates—as is depicted in the upper graph of FIG. 1—, while a high bed content under otherwise identical conditions leads to the production of few big granulates. If the target size of the completed granulates is fixed by setting the classifying discharge then, under steady-state conditions this necessitates, given the relationships mentioned and as drawn in FIG. 1, a bed content which provides exactly the corresponding number of nuclei. This bed content becomes established automatically without outside interference.

Figure 2:
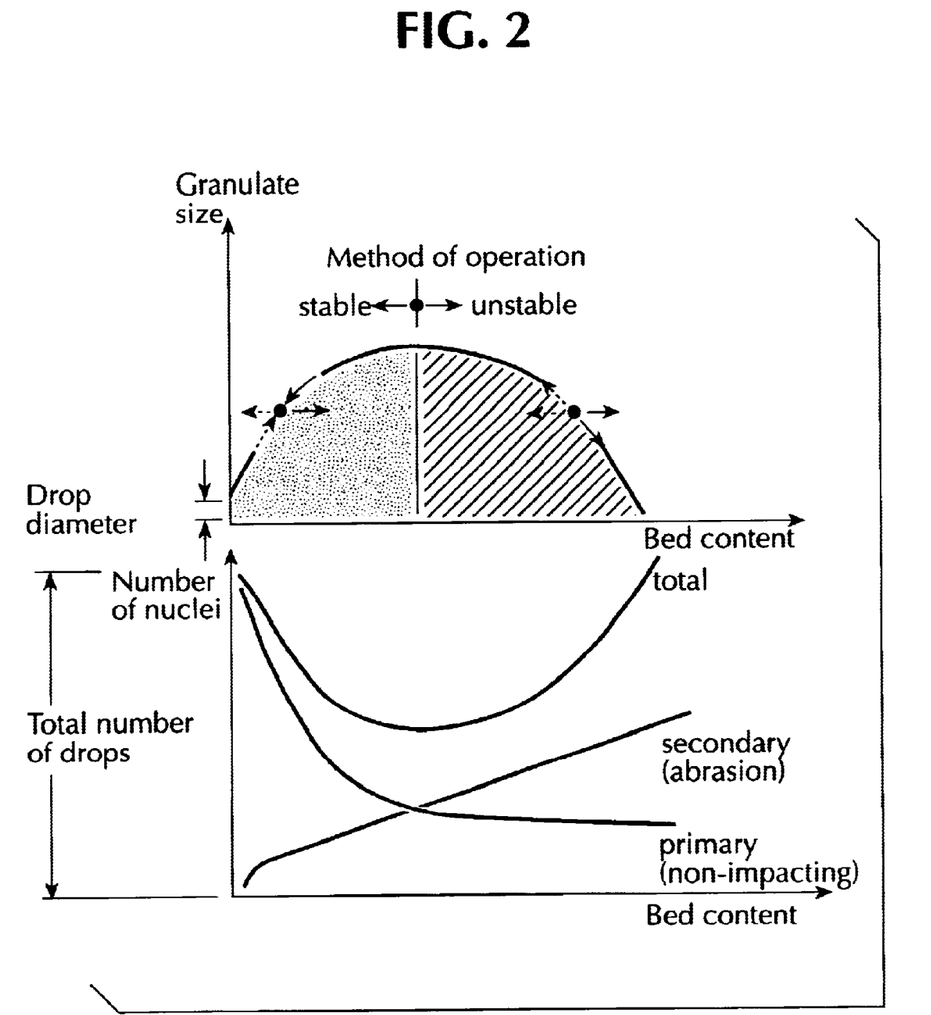
FIG. 2 shows a diagram for elucidating the interaction between granulate growth and nucleation with consideration of abrasion.

In this consideration, a further effect which contributes to nucleation has been deliberately disregarded, namely the effect of abrasion. Abrasion, which is highly product-dependent, makes the situation somewhat more complex.

In contrast to the primary nuclei considered so far, the number of secondary nuclei formed by abrasion increases with growing bed content, as can be seen in the bottom half of FIG. 2. Primary and secondary nuclei taken together constitute the total number of available nuclei. The total number of nuclei passes through a minimum. The consequence in turn is that a maximum granulate size cannot be exceeded. Moreover, a granulate size is associated with two different bed contents. This suggests that the two operating points be examined for stability.

As is known, a state is only stable when the reactions to perturbations are such that the perturbations are reversed again. For example, let the perturbation be an increase in the bed content in the left operating point. The reaction to this perturbtion consists in an enlargement of the granulates and, in the classifying discharge, in an increased discharge of granulate. The bed content thus becomes smaller again. The same reversing reaction occurs when the perturbation is in the other direction. The operating point is thus stable.

The test has a different result in the right operating point. In this case, a larger bed content results in a smaller granulate. The classifying discharge allows less granulate through. The bed content grows and consequently the overall state of the system moves away from the operating point. The same result is obtained on assuming that the perturbation acts in the other direction. The operating point is thus not stable.

The maximum point of the curve consequently defines the operating range of the self-regulating process. The granulation process is only stable on the left-hand side and therefore should only be used there.

Whether and where a maximum forms depends on the nucleation mechanism, which is primarily dependent upon the product. The essential product properties in relation to primary nucleation are the viscosity and surface tension of the feed. The number of primary nuclei can be affected by the fineness of the spray. Another factor is the rate of solidification, which is affected by the fluidising gas temperature.

The secondary nuclei are primarily affected by the binding action of the adhering solid. Other important factors are particle size, inflow velocity and residence time in the bed.

Figure 3:
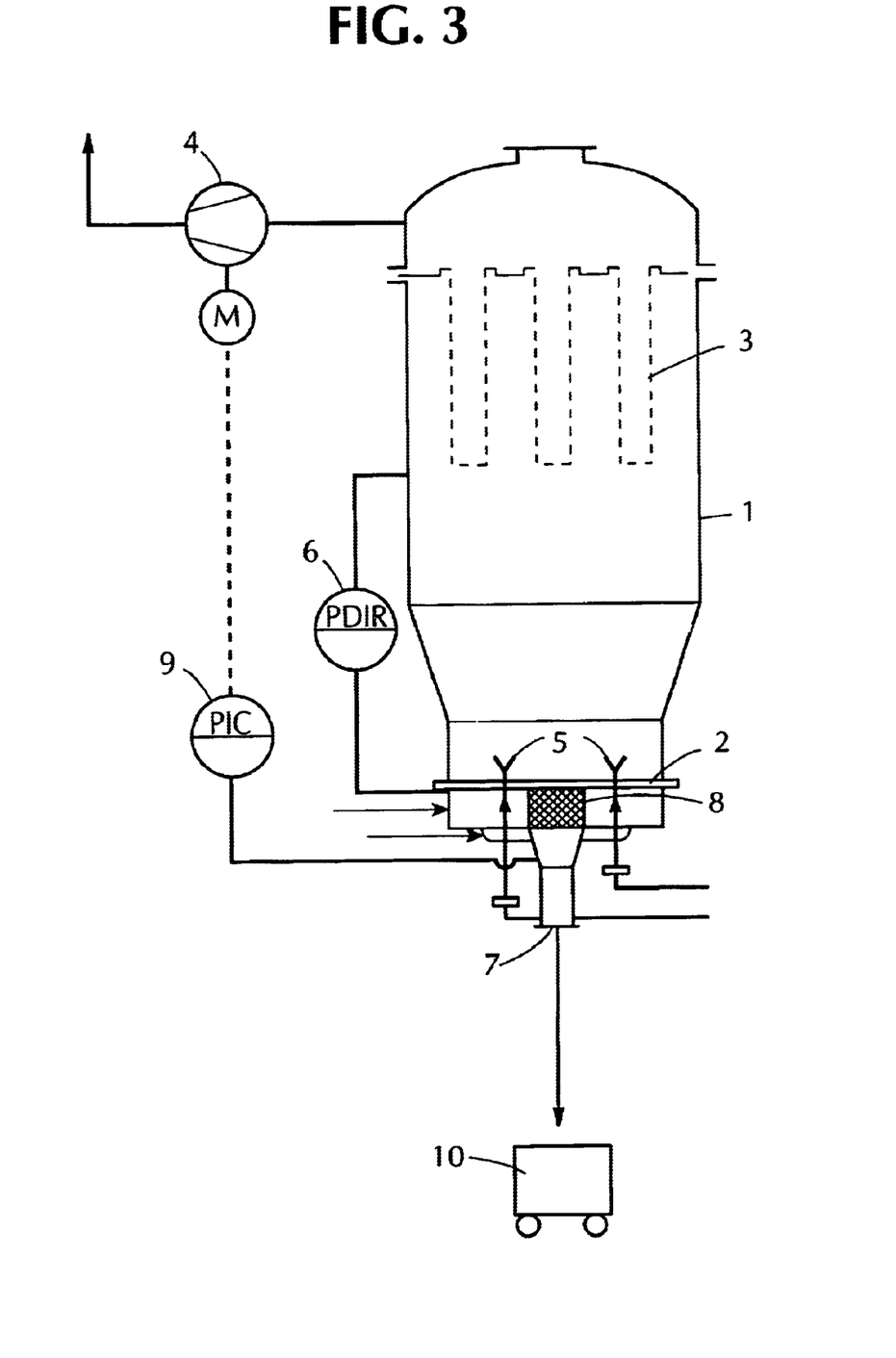
FIG. 3 shows a schematic representation of the entire apparatus according to the invention in the embodiment featuring internal return of fine material.

The process according to the invention can be carried out in a fluidised-bed apparatus of the type schematically depicted in FIG. 3 in the version featuring internal return of fine material. It consists of a vertically upright vessel 1 having a perforated outflow bottom 2 at the lower end and an attached off-gas filter 3 at the upper end. The resulting off-gas is extracted by the fan 4. Gas is blown through the perforated outflow bottom 2, so that a fluidised bed forms above the bottom in the granulation vessel 1.

The process according to the invention is preferably carried out in a fluidised-bed granulator which constitutes a two-part, preferably cylindrical, vessel. The granulation process takes place in the lower part of said vessel. The upper part, which preferably has twice the diameter of the lower part, serves for the preliminary separation of middle grain from, the off-gas and for solidifying those droplets in the spray which have not impacted on particles in the fluidised bed.

The separation of fine material or dust from the off-gas can take place either inside or outside the fluidised-bed granulator. Internal separation preferably takes place on filter tubes 3 arranged in the upperpart of the vessel 1. The precondition for the use of this type of filter tube is that the product agglomerates on the surface of the tube. The fine material thus agglomerated, on being cleaned off the filter tubes, falls back into the fluidised bed with sufficient speed of drop. External separation from the off-gas of fine material carried along therein is preferably effected by means of a cyclone or a filter. In this case, the separated-off fine material falls into a star wheel lock which is required for maintaining the pressure difference between fluidised bed and dust collector. From the star wheel lock the fine material is returned into the fluidised bed, preferably into the spray zone of the nozzles, preferably pneumatically by means of a drive gas stream by way of a separate line, so that a uniform growing of all particles of the grain size spectrum is ensured. It is also possible to use other customary methods of returning the fine material, as long as they ensure uniform distribution in the fluidised bed.

In the lower part of the fluidised-bed granulator, the gas serving as fluidising gas and for solidifying the sprayed-in product is passed in in the case of the process according to the invention by way of a perforated outflow bottom. The fluidising gas used can be any customary gas which is inert under the operating conditions. Preference is given to the use of air and inert gases, such as, for example, nitrogen.

The temperature of the fluidising gas can be varied within a relatively wide range. The temperatures used are generally between −20 and +700° C., preferably between 0 and 650° C.

The speed of the fluidising gas can be varied within a relatively wide range. The gas speeds (=empty tube speeds) used are in general 0.4 to 4 m/sec., preferably 0.5 to 2 m/sec.

The amount of the fluidising gas is calculated on basis of the speed of the fluidising gas, the density and the cross-sectional area of the granulation part of the apparatus.

The speed of the fluidising gas is chosen to be such that a highly agitated fluidised bed is maintained so that, on the one hand, there is no occurrence of undesirable caking together of the particles and, on the other, the abrasion in the fluidised bed and the off-gas removal of solids from the fluidised bed do not reach excessive levels.

The outflow bottom in the apparatus for carrying out the process according to the invention is either plane or funnel-shaped. The outflow bottom is preferably constructed in the shape of a funnel, the aperture angle of which can be varied within a certain range. The funnel preferably has an aperture angle between 140° and 160°. By using outflow bottoms which have such aperture angles and which are made of perforated metal trays which ensure a radially inwardly directed outflow, in particular the larger particles in the fluidised bed are guided towards the classifying discharge, the entry port of which is in the centre of the outflow bottom.

However, other kinds of the outflow bottom classifier arrangement are also possible. For instance, the granulator can also be constructed in a rectangular form with a plane or inclined bottom. The use of several classifiers distributed over the outflow area is also possible. The bottom segments can be plane or inclined towards the classifier. In a particularly preferred embodiment, the cross-sectional area of the bottom segment has the shape of a hexagon. Similar to the arrangement depicted in FIG. 9, a nozzle surrounded by a circular classifier is mounted in the centre of each of the bottom segments. In this manner, the granulator is built up above a plurality of bottom segments of the same kind. It is achieved with this arrangement that the frequency of the classification remains constant independently of the dimensions of the apparatus.

As is also revealed in FIG. 3, attached at the level of the fluidised bed are spray nozzles 5 with which the liquid product is fed into the fluidised bed in finely divided form. The attainment and maintenance of the steady state in the fluidised bed are controlled by way of the self-adjusting bed pressure loss. The bed pressure loss is indicated and recorded by the pressure-measuring instrument 6. Deviations from the standard value indicate the presence of perturbations in the granulation process. Mounted in the centre of the out-flow bottom 2 is a discharge tube 7, into the upper part of which, the part adjoining the outflow bottom 2, a zig-zag classifier 8 is installed to be flush with the out-flow bottom Z. A further pressure regulator 9 is contained between the output point of the zig-zag classifier 8 and the off-gas fan 4. This regulator 9 regulates the off-gas fan 4 in such a way that there is constantly a pressure which is only slightly below atmospheric pressure at the output point of the zig-zag classifier. In this way it is possible to dispense with any further element sealing off the zig-zag classifier, such as, for example, a lock. The completed granulate falls unhinderedly from the discharge 7 and is collected in a reservoir vessel 10.

In the process according to the invention, the liquid product which is injected into the fluidised bed is preferably sprayed upward into the fluidised bed.

To spray the liquid product into the fluidised bed, the process according to the invention preferably uses two-material nozzles which give fine atomisation of the liquid product and also contribute to a thorough mixing of the fluidised bed.

If the neutral point of the pressure profile is located in the classifying discharge, a diminished pressure exists in the granulator. The nozzles can be replaced in the course of current operation but that air escapes into the environment. The air streaming into the granulator from outside through the installation gaps of the nozzles further prevents the escape of product. An embodiment is preferred in which atomisation gas is streaming against the penetrating air in order to avoid a penetration of air into inertised plants during the replacement. mixing of the fluidised bed. In a particularly preferred embodiment, these nozzles are installed in such a way that they can be replaced during the granulation process.

Figure 8:
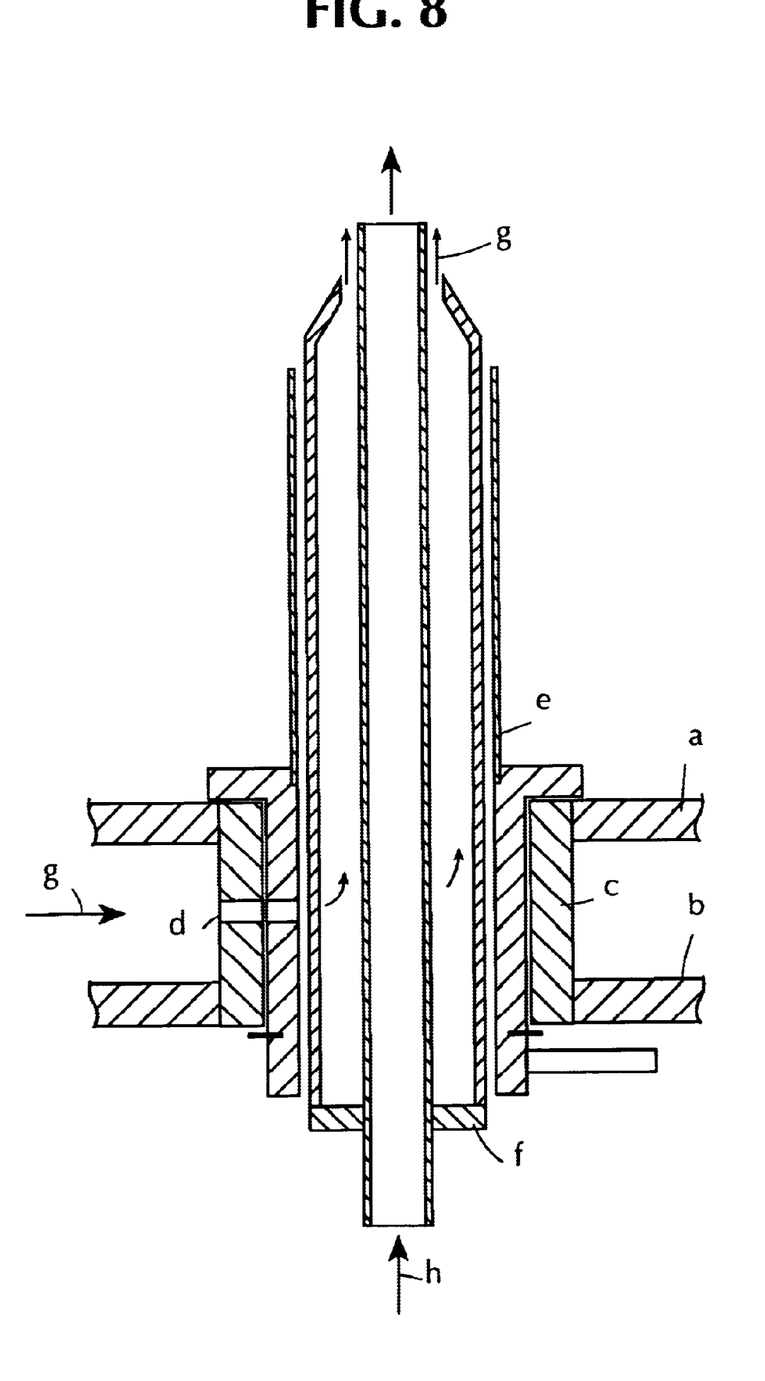
FIG. 8 shows a cross-section through a two-material nozzle which is replaceable during operation.

A schematic representation of such an arrangement is reproduced in FIG. 8. In this figure, a denotes the bottom of the outflow vault b denotes a further bottom c denotes a bushing d denotes a lateral bore e denotes a nozzle guide tube f denotes a two-material nozzle g denotes an atomisation gas supply line h denotes a product supply line The gas (g) serving for atomising the liquid product is in this case passed through a space which is formed below the outflow bottom (a) by an additional bottom (b). The bottoms bounding the space have therein for each nozzle (f) a bushing (c) which has a bore (d) on the side and is intended for receiving the nozzle guide tube (e). The nozzle guide tube is of a length such that it reaches from the under edge of the bushing to just above the outflow bottom. It is likewise provided with a lateral bore, so that by turning the nozzle guide tube the supply of atomisation gas to the nozzle can be completely or partially interrupted. When the nozzle has been pulled out of the nozzle guide tube, it is necessary that sufficient atomisation gas streams into the installation gap that no particles can fall out of the fluidised bed through this opening and besides no environmental air penetrates into the granulator. The two-material nozzle likewise contains a lateral bore through which the atomisation gas, when the nozzle has been installed, can flow from the nozzle guide tube into the gas guide passageway of the nozzle.

The feed of the liquid product in carrying out the process according to the invention is regulated in the manner customary in the case of granulators and spray dryers, namely via the temperature of the off-air.

Figure 4:
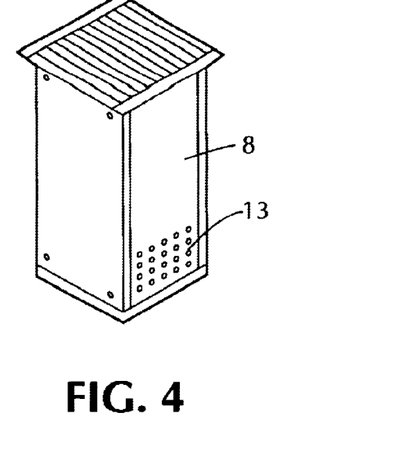
FIG. 4 shows a perspectival representation of the zig-zag classifier present at the discharge point of the fluidised-bed apparatus.
Figure 5:
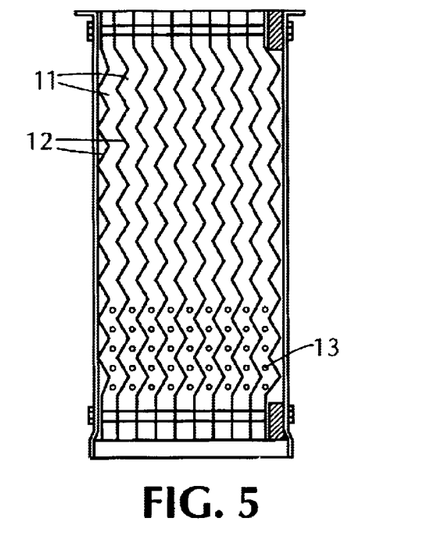
FIG. 5 shows a cross-section through the zig-zag classifier.

As can be seen in FIGS. 4 and 5, the zig-zag classifier 8 in the depicted apparatus according to the invention consists of a plurality of straight rectangular channels 11 which meet at an angle of about 120°. The channels 11 are bounded by riffling metals 12 bent into a zig-zag shape. At the lower end of the zig-zag classifier 8 is a gas divider 13 by means of which the same amount of gas is introduced into all the classifying gas channels. A vortex roll forms in every classifier element, classifier element to be understood as meaning in this case the stretch between two adjacent classifying places. The material to be classified slides down along the lower surface in each case, passes through the classifying gas stream, then moves upwardly along the upper surface in each case, and then passes again through the classifying gas stream. On each pass through the classifying gas stream, classification is effected, so that despite the low separating efficiency in the individual classifier elements the repetition ensures that over-all the separating efficiency is high.

In working with zig-zag classifiers, it is particularly advantageous to use a classifier of adjustable cross-section (compare FIG. 5).

Figure 6:
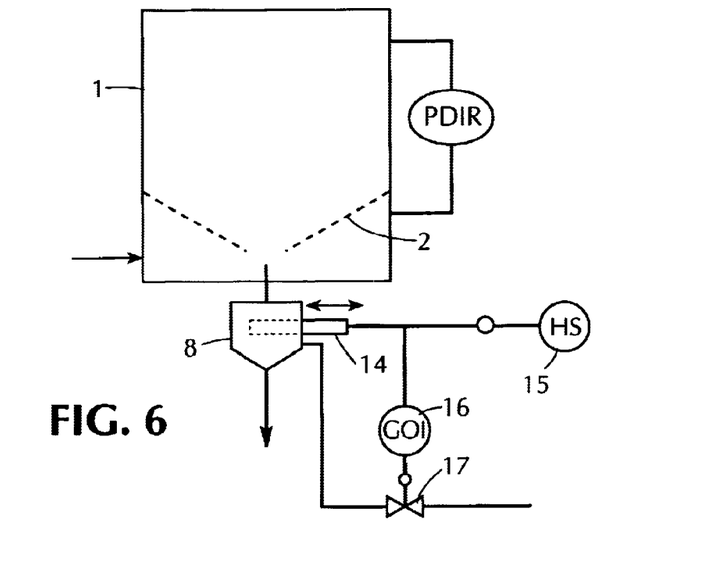
FIG. 6 shows the adjusting means on the zig-zag classifier for adjusting the discharge cross-section.

The required minimum passage cross-section of the classification line in the zig-zag classifier needs to be decided experimentally, since said cross-section depends on the grain distribution of the bed and the granulate stream to be discharged. If the passage cross-section is too small, then steady-state operation in accordance with FIG. 1 is not possible, since an insufficient amount of granulate is discharged and in this case bed content and grain size grow uncontrolled. If, on the other hand, the passage cross-section is too large, then it is true that granulate formation is not perturbed, but this mode of operation can be unfavourable from energy aspects. Therefore, to change the passage cross-section, the classifier (compare FIG. 6) contains an adjusting means 14 with which the gap length in the zig-zag classifier and hence the classifier cross-section can be changed. The adjusting means is comprised of bars which are connected to one another like a comb, which are adapted to the zig-zag cross-section and which are slideable transversely, that is to say perpendicularly to the axis of the classifier, by means of a pushing device 15. The adjusting means 14 is connected to a regulating device 16 which regulates the classifying gas stream by way of valve 17 in such a way that the flow velocity in the zig-zag classifier 8 remains constant despite the variable cross-section. The optimal setting of the adjusting means is determined empirically by first seeking the classifying gas throughput required for the desired granulate size in the fully opened state. The bed content adjusts automatically. Then the free classifier cross-section is reduced by means of the adjusting means until the bed content (measured via the bed pressure loss) increases. That represents the minimum classifier cross-section required for the granulation process. For steady-state operation, the classifier cross-section is chosen to be somewhat larger than absolutely necessary, in order to ensure stable operating conditions.

Figure 9:
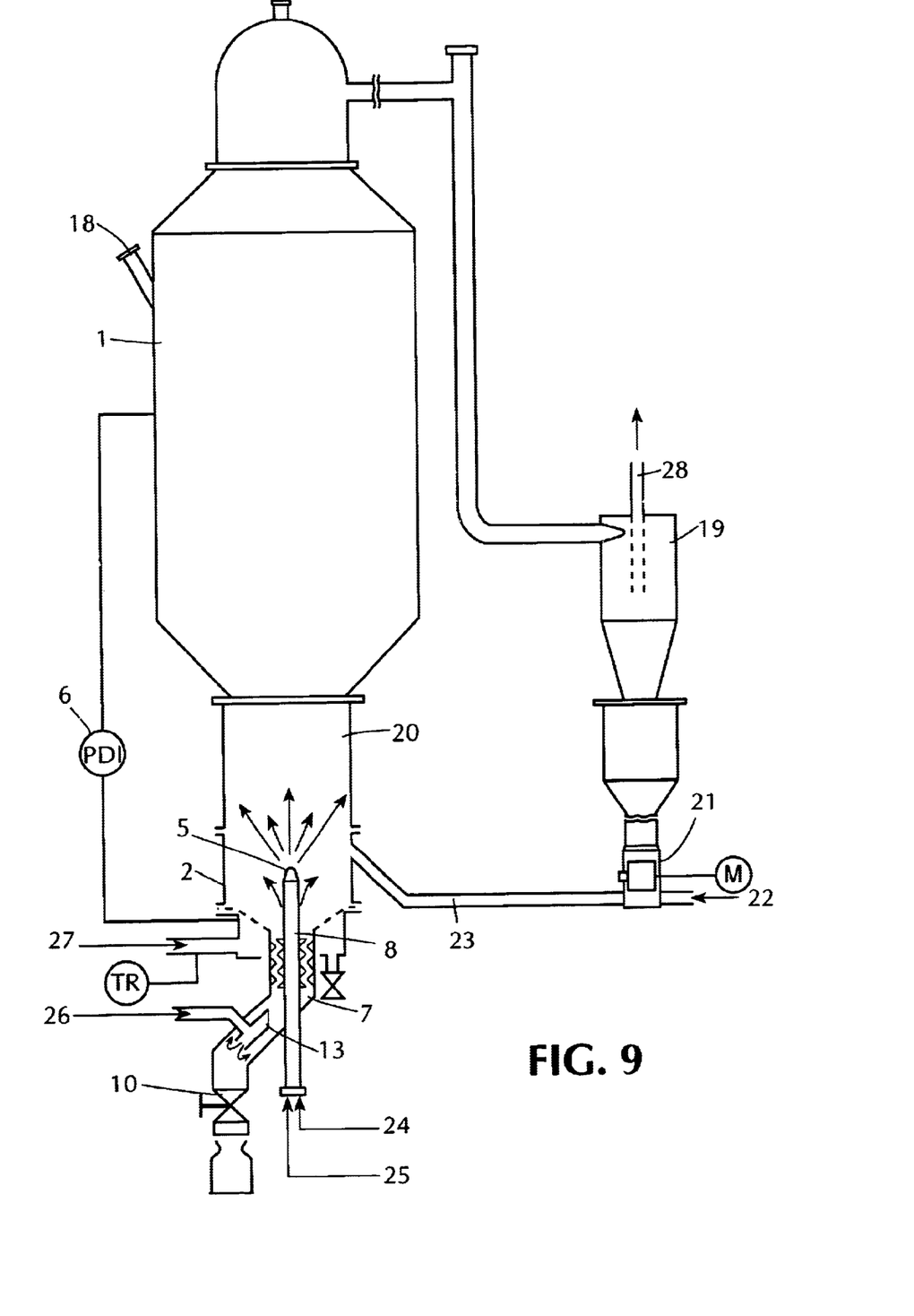
FIG. 9 is a schematic representation of the apparatus of the invention, showing a nozzle surrounded by a circular classifier, mounted in the center of the bottom segment.

A particularly advantageous apparatus for carrying out the process according to the invention is schematically depicted in FIG. 9. In this drawing, the indicated numbers have the following meanings:

1=granulator vessel
2=outflow bottom
5=spray nozzle
6=pressure-measuring instrument
7=discharge tube
8=zig-zag classifier in circular gap form
10=product discharge
13=classifying gas distributor
18=intake port for the starting granulate
19=fine material separator (cyclone)
20=cylindrical shot
21=star wheel lock
22=drive gas supply line
23=fine material return
24=atomisation gas supply line
25=supply line for the product to be sprayed
26=classifying gas supply line
27=supply line for the fluidising gas
28=off-gas exit to the fan In the granulates according to the invention, the percentages of the components contained therein can be varied within a relatively wide range. The proportion of active component or of active components is generally between 1 and 100% by weight. If the individual active substances are sprayed in as melts or solutions, the resulting granulate is composed up to 100% by weight of the respective substances, and if desired up to 5% by weight of solvents or diluents are present. If the matter sprayed is liquids which, in addition to the active components, contain further constituents, such as inert filler materials, dispersants, binders and/or other additives, the proportion of active components is generally between 5 and 95% by weight, preferably between 10 and 80% by weight. The proportion of inert filler materials is generally 0 to 99% by weight, preferably 0 to 95% by weight. Dispersants and/or binders and if desired further additives are generally present in proportions of 0 to 40% by weight, preferably 0 to 30% by weight.

The granulate particles according to the invention generally have a particle size of 0.1 to 3 mm, preferably 0.2 to 2 mm. The grain size of the granulate particles according to the invention depends on the specific intended use of the granulates. The grain size distribution is very narrow, compared to conventionally produced granulates. In general, the particle diameter only differs by at most half a mean grain size from the mean particle diameter ($d_{50}$)

The granulate particles according to the invention are uniformly shaped and are of high strength. They have a compact microporous structure and are nevertheless spontaneously dispersible or soluble in water or other solvents. Spontaneous dispersibility or solubility is to be understood as meaning in the present case that the particles completely disperse or dissolve in general in 0.5 to 3 minutes, preferably in 1 to 2 minutes.

The granulates according to the invention, depending on the active components that they contain, can be used for all manner of purposes. Those granulates which contain agrochemical active substances as active components can be used by conventional methods in crop protection. For example, granulates of this type are dispersed or dissolved in water. The resulting dispersions and solutions, if desired after previous dilution, can be applied to the crops and/or their habitat by conventional methods, that is to say for example by spraying, atomising or pouring. The application level depends on the concentration of the dispersion or solution and on the specific indication and on the active components contained therein.

If the granulates according to the invention contain not agrochemical active substances but other active components, the application is effected by the methods which are customary in the respective technical field. In this case too the application level is dependent on the specific active components and on the specific indication.

In some case the granulates prepared using the process according to the invention can also be subjected to a thermal aftertreatment. For instance, zeolite granules can be hardened or activated by heating to temperatures between 300 and 700° C., preferably between 350 and 650° C. Granulates which contain inorganic oxides and come into consideration for use as catalysts or catalyst supports can be hardened by heating to temperatures between 500 and 1,000° C.

The process according to the invention is illustrated by the following examples.

PREPARATION EXAMPLES

Example 1

A granulating apparatus according to the invention of the type depicted in FIG. 9 having the following dimensions

Figure 7:
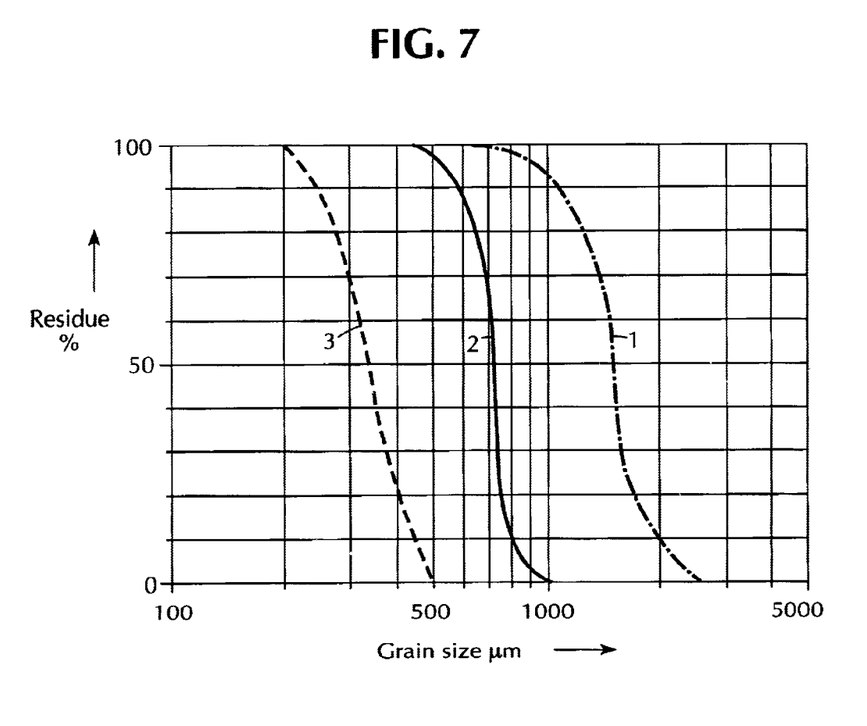
FIG. 7 shows the grain size distribution obtained at the output point of the classifier, which was determined on those granulates whose preparation is described in Examples 1 to 3

| Diameter of outflow bottom | 225 mm |
|---|---|
| Diameter of settling space | 450 mm |
| Total height of granulator | about 2 m |
| Spray nozzles | 1 two-material nozzle |
| Classifier cross-section | 880 mm² |
| Zig-zag classifier | 10 elements | is used to carry out a granulation of an aqueous sodium chloride solution containing 23% by weight of sodium chloride. This solution is sprayed at a temperature of 20° C. into the fluidised-bed granulator. To fluidise the bed content, air is blown in at a rate of 127.5 kg per hour. The entry temperature of the fluidising gas is 180° C.; the exit temperature is 80° C. The classifying gas blown in is air at a rate of 18 kg/hour. The temperature of classifying gas is 20° C. The content of the fluidised bed is 3 kg; the granulation output is 1.5 kg per hour. The result is a free-flowing granulate having a bulk density of 1,075 kg/m³ and a mean particle size $d_{50}=1.5$ mm. The particle size distribution determined by sieve analysis is plotted as curve 1 in FIG. 7.

Example 2

The apparatus described in Example 1 is used to carry out the granulation of an aqueous suspension.

First, a pulverulent premix which consists of

50% by weight of 2-isopropoxyphenyl N-methylcarbamate,

2% by weight of magnesium oxide,

4% by weight of highly disperse silica,

10% by weight of alkylarylsulphonate and

34% by weight of ground rock is mixed with stirring with sufficient water that the result is an aqueous suspension having a solids content of 60% by weight. This suspension is sprayed at a temperature of 20° C. into the fluidised-bed granulator. The granulation takes place under the conditions indicated hereinafter.

| Fluidising gas: | Air |
|---|---|
| | Gas throughput 127.5 kg/h |
| | Entry temperature 95° C. |
| | Exit temperature 35° C. |
| Classifying gas: | Air |
| | Gas throughput 12 kg/h |
| | Gas temperature 20° C. |
| Bed content: | 1.2 kg |
| Granulation output: | 4 kg/h |

The result is a free-flowing granulate having a bulk density of 785 kg/m³ and, a mean particle size $d_{50}=0.7$ mm. The particle size distribution determined by sieve analysis is plotted as curve 2 in FIG. 7.

Example 3

The apparatus described in Example 1 is used to granulate a melt.

An alkyl polyglycol ether which melts at 60° C. is sprayed at a temperature of 70° C. into the fluidised-bed granulator. The granulation takes place under the conditions indicated hereinafter.

| Fluidising gas: | Air |
|---|---|
| | Gas throughput 127.5 kg/h |
| | Entry temperature 18° C. |
| | Exit temperature 25° C. |
| Classifying gas: | Air |
| | Gas throughput 8 kg/h |
| | Gas temperature 20° C. |
| Bed content: | 1.8 kg |
| Granulation output: | 3 kg/h |

The result is a free-flowing granulate having a bulk density of 535 kg/m³ and a mean particle size $d_{50}=0.36$ mm. The particle size distribution determined by sieve analysis is plotted as curve 3 in FIG. 7.

Example 4

An apparatus according to the invention as described in Example 1 is used to granulate an aqueous suspension (slurry). The spray nozzle in said apparatus is a two-material nozzle. The The classifier used is a zig-zag classifier. The fine material is separated externally by means of a cyclone.

First a premix which consists of

70% by weight of 6-phenyl-4-amino-3-methyl-1,2,4-triazin-5(4H)-one,

5% by weight of alkylarylsulphonate,

5% by weight of ground alumina and

20% by weight of a dispersant based on ligninsulphonate is mixed with stirring with sufficient water that the result is an aqueous suspension having a solids content of 65% by weight. This slurry is sprayed at a temperature of 20° C. by means of air into the fluidised-bed granulator. The continuous granulation is carried out under the conditions indicated hereinafter.

|  |  |
|---|---|
| Fluidising gas: | Air |
|  | Gas throughput 130 kg/h |
|  | Entry temperature 96° C. |
|  | Exit temperature 60° C. |
| Classifying gas: | Air |
|  | Gas throughput 8 kg/h |
|  | Gas temperature 20° C. |
| Drive gas: | Air |
|  | Gas throughput 9 kg/h |
| Granulation output: | 2.4 kg/h |

The result is a dust-free free-flowing granulate having a bulk density of

The granulate particles are virtually round. Mean grain size $d_{50}=$

The granulate is dispersible in water within seconds.

Example 5

The apparatus mentioned in Example 1 is used to granulate an aqueous suspension (slurry).

First a pulverulent premix which contains

N-(5-ethylsulphonyl-1,3,4-thiadiazol-2-yl)-N,N'-dimethylurea is mixed with stirring with sufficient water that the result is an aqueous suspension having a solids content of 60% by weight. This suspension is sprayed into the fluidised-bed granulator by means of atomisation gas. The granulation takes place under the conditions indicated hereinafter.

|  |  |
|---|---|
| Fluidising gas: | Nitrogen |
|  | Gas throughput 127 kg/h |
|  | Entry temperature 80° C. |
|  | Exit temperature 40° C. |
| Classifying gas: | Nitrogen |
|  | Gas throughput 9 kg/h |
|  | Gas temperature 40° C. |
| Atomisation gas: | Nitrogen |
|  | Gas throughput 6 kg/h |
|  | Gas temperature 20° C. |
| Drive gas (return): | Nitrogen |
|  | Gas throughput 15 kg/h |
|  | Gas temperature 40° C. |
| Granulation output: | 3 kg/h |

The result is a dust-free free-flowing granulate having a bulk density of 690 kg/m³. Mean particle size $d_{50}=500$ μm.

Example 6

The apparatus mentioned in Example 1 is used to granulate an aqueous suspension (slurry).

A pulverulent premix which contains

N,N-dimethyl-N'-(fluorodichloro-methylmercapto)-N'-(4-methyl-phenyl)-sulphamide, is mixed with stirring with sufficient water that the result is an aqueous suspension having a solids content of 60% by weight. This suspension is sprayed into the fluidised-bed granulator by means of atomisation gas. The granulation takes place under the conditions indicated hereinafter.

|  |  |
|---|---|
| Fluidising gas: | Nitrogen |
|  | Gas throughput 127 kg/h |

-continued

|  |  |
|---|---|
|  | Entry temperature 95° C. |
|  | Exit temperature 35° C. |
| Classifying gas: | Nitrogen |
|  | Gas throughput 11.5 kg/h |
|  | Gas temperature 40° C. |
| Atomisation gas: | Nitrogen |
|  | Gas throughput 6 kg/h |
|  | Gas temperature 20° C. |
| Drive gas (return): | Nitrogen |
|  | Gas throughput 20.8 kg/h |
|  | Gas temperature 40° C. |
| Granulation output: | 3.8 kg/h |

The result is a dust-free free-flowing granulate having a bulk density of 683 kg/m³. Mean particle size $d_{50}=400$ um.

Example 7

The apparatus mentioned in Example 1 is used to granulate an aqueous suspension (slurry).

First a pulverulent premix which contains 1-(4-chlorophenoxy)-3,3-dimethyl-1-(1,2,4-triazol-1-yl)-butan-2-ol is mixed with stirring with sufficient water that the result is an aqueous suspension having a solids content of 50% by weight. This suspension is sprayed into the fluidised-bed granulator by means of atomisation gas. The granulation takes place under the conditions indicated hereinafter.

|  |  |
|---|---|
| Fluidising gas: | Nitrogen |
|  | Gas throughput 127 kg/h |
|  | Entry temperature 85° C. |
|  | Exit temperature 35° C. |
| Classifying gas: | Nitrogen |
|  | Gas throughput 11.5 kg/h |
|  | Gas temperature 35° C. |
| Atomisation gas: | Nitrogen |
|  | Gas throughput 6.5 kg/h |
|  | Gas temperature 20° C. |
| Drive gas (return): | Nitrogen |
|  | Gas throughput 19 kg/h |
|  | Gas temperature 35° C. |
| Granulation output: | 2.5 kg/h |

The result is a dust-free free-flowing granulate having a bulk density of 942 kg/m³. Mean particle size $d_{50}=400$ um.

Example 8

The apparatus mentioned in Example 1 is used to granulate an aqueous suspension (slurry).

First a pulverulent premix which contains 1-(4-chlorophenoxy)-3,3-dimethyl-1-(1,2,4-triazol-1-yl)-butan-2-one is mixed with stirring with sufficient water that the result is an aqueous suspension having a solids content of 60% by weight. This suspension is sprayed into the fluidised-bed granulator by means of atomisation gas. The granulation takes place under the conditions indicated hereinafter.

|  |  |
|---|---|
| Fluidising gas: | Nitrogen |
|  | Gas throughput 127 kg/h |
|  | Entry temperature 50° C. |
|  | Exit temperature 29° C. |

-continued

| | |
|---|---|
| Classifying gas: | Nitrogen |
| | Gas throughput 25 kg/h |
| | Gas temperature 40° C. |
| Atomisation gas: | Nitrogen |
| | Gas throughput 6 kg/h |
| | Gas temperature 20° C. |
| Drive gas (return): | Nitrogen |
| | Gas throughput 10 kg/h |
| | Gas temperature 40° C. |
| Granulation output: | 1.5 kg/h |

The result is a dust-free free-flowing granulate having a bulk density of 667 kg/m$^3$. Mean particle size $d_{50}$=500 um.

Example 9

The apparatus mentioned in Example 1 is used to granulate an aqueous suspension (slurry).

First a pulverulent premix which contains
N-(2-benzothiazolyl)-N,N'-dimethylurea
is mixed with stirring with sufficient water that the result is an aqueous suspension having a solids content of 50% by weight. This suspension is sprayed into the fluidised-bed granulator by means of atomisation gas. The granulation takes place under the conditions indicated hereinafter.

| | |
|---|---|
| Fluidising gas: | Nitrogen |
| | Gas throughput 127 kg/h |
| | Entry temperature 85° C. |
| | Exit temperature 40° C. |
| Classifying gas: | Nitrogen |
| | Gas throughput 15.5 kg/h |
| | Gas temperature 40° C. |
| | Gas temperature 40° C. |
| Atomisation gas: | Nitrogen |
| | Gas throughput 6 kg/h |
| | Gas temperature 20° C. |
| Drive gas (return): | Nitrogen |
| | Gas throughput 21 kg/h |
| | Gas temperature 35° C. |
| Granulation output: | 3.3 kg/h |

The result is a dust-free free-flowing granulate having a bulk density of 575 kg/m$^3$. Mean particle size $d_{50}$=1,000 μm.

Example 10

The apparatus mentioned in Example 4 is used to granulate an aqueous suspension (slurry).

First a pulverulent premix which contains
97.5% by weight of 4-amino-6-(1,1-dimethylethyl)-3-methylthio-1,2,4-triazin-5(4H)-one
is mixed with stirring with sufficient water that the result is an aqueous suspension having a solids content of 50% by weight. This suspension is sprayed into the fluidised-bed granulator by means of atomisation gas. The granulation takes place under the conditions indicated hereinafter.

| | |
|---|---|
| Fluidising gas: | Nitrogen |
| | Gas throughput 127 kg/h |
| | Entry temperature 100° C. |
| | Exit temperature 40° C. |
| Classifying gas: | Nitrogen |
| | Gas throughput 11.5 kg/h |
| | Gas temperature 40° C. |
| Atomisation gas: | Nitrogen |
| | Gas throughput 6.6 kg/h |
| | Gas temperature 20° C. |
| Drive gas (return): | Nitrogen |
| | Gas throughput 14.5 kg/h |
| | Gas temperature 40° C. |
| Granulation output: | 4.5 kg/h |

The result is a dust-free free-flowing granulate having a bulk density of 530 kg/m$^3$. Mean particle size $d_{50}$ =450 μm.

What is claimed is:

1. An apparatus for the continuous preparation of granules, said apparatus comprising:

a) a fluidized-bed vessel;

b) means for introducing granule starting material consisting of granule-forming liquid into said vessel, said means comprising spraying means, said spraying means comprising a two-material nozzle for spraying two different materials into said vessel, the nozzle being located level with the fluidized bed, and there being a distance between a top end of the nozzle and a bottom of the vessel;

c) a fluidizing means for dispersing the liquid and building the fluidized bed, the fluidizing means supplying atomizing gas in such a way that no environmental air penetrates into the vessel and no granules escape from the apparatus;

d) a means for returning to the bottom end of said vessel adjacent to and above the spraying means fine granules that escape from said vessel adjacent the top of said vessel;

e) at least one countercurrent gravity zig-zag classifier of adjustable cross section at an outflow bottom of said vessel, said classifier being the only means of classifying grain size in said apparatus; and f) an adjusting means for varying the cross section of the classifier, said adjusting means being connected to a regulating device which regulates a classifying gas stream by way of a valve in such a way that a flow velocity in the classifier remains constant.

* * * * *

UNITED STATES PATENT AND TRADEMARK OFFICE
CERTIFICATE OF CORRECTION

PATENT NO. : 6,680,032 B1  Page 1 of 1
APPLICATION NO. : 08/002528
DATED : January 20, 2004
INVENTOR(S) : Uhlemann et al.

It is certified that error appears in the above-identified patent and that said Letters Patent is hereby corrected as shown below:

Column 8, line 39, "countercurrent .gravity" should read -- countercurrent gravity --

Column 9, line 60, "contend can" should read -- content can --

Column 16, line 53, "The The" should read -- The --

Signed and Sealed this

Twenty-second Day of May, 2007

JON W. DUDAS
*Director of the United States Patent and Trademark Office*